United States Patent
Zhou et al.

(10) Patent No.: US 10,234,182 B2
(45) Date of Patent: Mar. 19, 2019

(54) FLASH TANK AND AIR CONDITIONER HAVING THE SAME

(71) Applicant: GREE ELECTRIC APPLIANCES, INC. OF ZHUHAI, Zhuhai, Guangdong (CN)

(72) Inventors: Tang Zhou, Zhuhai (CN); Yu Zhou, Zhuhai (CN); Chenguang Wang, Zhuhai (CN); Juan Wang, Zhuhai (CN); Xianquan Liu, Zhuhai (CN); Cui Pan, Zhuhai (CN); Liang Wan, Zhuhai (CN); Chengzhao Jin, Zhuhai (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 0 days.

(21) Appl. No.: 15/505,401

(22) PCT Filed: Dec. 26, 2014

(86) PCT No.: PCT/CN2014/095183
§ 371 (c)(1),
(2) Date: Feb. 21, 2017

(87) PCT Pub. No.: WO2016/026253
PCT Pub. Date: Feb. 25, 2016

(65) Prior Publication Data
US 2017/0268809 A1    Sep. 21, 2017

(30) Foreign Application Priority Data
Aug. 22, 2014    (CN) .......................... 2014 1 0419678

(51) Int. Cl.
F25B 1/10    (2006.01)
F25B 41/06   (2006.01)
F25B 43/00   (2006.01)

(52) U.S. Cl.
CPC .............. *F25B 43/006* (2013.01); *F25B 1/10* (2013.01); *F25B 41/06* (2013.01); *F25B 41/062* (2013.01);
(Continued)

(58) Field of Classification Search
CPC .......... F25B 43/006; F25B 1/10; F25B 41/06; F25B 41/062; F25B 2400/23;
(Continued)

(56) References Cited

U.S. PATENT DOCUMENTS 2,164,761 A * 7/1939 Ashley .................... F25B 1/053
                                                          62/117
4,232,533 A * 11/1980 Lundblad .................. F25B 1/10
                                                          62/509

(Continued)

FOREIGN PATENT DOCUMENTS

CN      101568769 A      10/2009
CN      101583834 A      11/2009
(Continued)

OTHER PUBLICATIONS

European Patent Office, Patent Search Report dated Feb. 13, 2018.
(Continued)

*Primary Examiner* — Cassey D Bauer
(74) *Attorney, Agent, or Firm* — Li & Cai Intellectual Property (USA) Office

(57) ABSTRACT

Provided are a flash tank and an air conditioner having the same. The flash tank includes a flash tank liquid inlet (11) and a flash tank liquid outlet (12). The flash tank further includes: a plurality of flash chambers, wherein the flash
(Continued)

chambers are arranged in sequence, every two adjacent flash chambers communicating; and a plurality of air replenishment openings (14), the air replenishment openings (14) and the flash chambers corresponding one to one and communicating with each other. The flash tank liquid inlet (11) communicates with the first flash chamber of the flash chambers, and the flash tank liquid outlet (12) communicates with the last flash chamber of the flash chambers. The flash tank may meet an air replenishment demand of a multi-stage compressor.

7 Claims, 1 Drawing Sheet

(52) U.S. Cl.
CPC ........ *F25B 43/00* (2013.01); *F25B 2341/065* (2013.01); *F25B 2400/13* (2013.01); *F25B 2400/23* (2013.01); *F25B 2500/01* (2013.01)

(58) Field of Classification Search
CPC .... F25B 2341/065; F25B 43/02; F25B 9/008; F25B 31/008; F25B 2309/061; F25B 2341/066; F25B 43/00; F25B 2400/13
USPC .......................................................... 62/510
See application file for complete search history.

(56) References Cited

U.S. PATENT DOCUMENTS

| | | | |
|---|---|---|---|
| 4,457,768 A | 7/1984 | Bellinger | |
| 2002/0050149 A1* | 5/2002 | Kawada | F25B 1/10 62/510 |
| 2005/0235689 A1 | 10/2005 | Lifson et al. | |
| 2007/0251256 A1* | 11/2007 | Pham | F04C 29/042 62/324.1 |
| 2011/0056664 A1* | 3/2011 | De Larminat | F25B 39/028 165/160 |
| 2011/0124068 A1* | 5/2011 | Evanko | B01D 1/30 435/157 |
| 2011/0162397 A1* | 7/2011 | Huff | F25B 1/10 62/115 |
| 2013/0269916 A1* | 10/2013 | Schreiber | F28F 9/005 165/160 |
| 2014/0196490 A1* | 7/2014 | Nemit, Jr. | F04B 35/04 62/115 |

FOREIGN PATENT DOCUMENTS

| | | |
|---|---|---|
| CN | 101932890 A | 12/2010 |
| CN | 102168895 A | 8/2011 |
| CN | 103292528 A | 9/2013 |
| CN | 203518370 U | 4/2014 |
| CN | 104154687 A | 11/2014 |
| CN | 204027104 U | 12/2014 |
| EP | 1860390 A2 | 11/2007 |
| GB | 2446062 A | 7/2008 |
| JP | S60207860 A | 10/1985 |
| KR | 10-0569833 B1 | 4/2006 |
| KR | 10-2013-0000523 A | 1/2013 |

OTHER PUBLICATIONS

China Patent Office, Patent Search Report.
Mathison Margaret M, et al., "Approaching the performance limit for economized cycles using simplified cycles", International Journal of Refrigeration, Lesevier, Paris, FR, vol. 45, Jun. 9, 2014, pp. 64-72, XP029047499.

* cited by examiner

FLASH TANK AND AIR CONDITIONER HAVING THE SAME

TECHNICAL FIELD OF THE INVENTION

The invention relates to a flash tank and an air conditioner having the same.

BACKGROUND OF THE INVENTION

In the prior art, as shown in FIG. 1, a flash tank includes a flash chamber 1', and a flash tank liquid inlet 11' and a flash tank liquid outlet 12', located in one side of the flash chamber 1'.

High-temperature and high-pressure liquid refrigerants coming from a condenser enter the flash chamber 1' by the flash tank liquid inlet 11', a small number of liquid refrigerants become air under an action of flash evaporation, the air enters a compressor by an air replenishment opening 13' and is compressed again, and meanwhile, certain heat is absorbed, so the temperature of the remaining liquid refrigerants drops, and the remaining liquid refrigerants enters an evaporator via the flash tank liquid outlet 12' finally. The above-mentioned flash tank has the following defects.

(1) The flash tank has only one air replenishment opening 13', and requirements of a multi-stage compressor and a multi-stage air replenishment unit cannot be met.

(2) The flash tank does not have a throttle device, thereby is difficult to accurately control the flow of air discharged from the air replenishment opening 13'.

SUMMARY OF THE INVENTION

The invention aims to provide a flash tank and an air conditioner having the same, which may meet an air replenishment demand of a multi-stage compressor.

To this end, according to an aspect of the invention, a flash tank is provided, which comprises a flash tank liquid inlet and a flash tank liquid outlet. The flash tank further comprises: a plurality of flash chambers, wherein the flash chambers are arranged in sequence, every two adjacent flash chambers communicating; and a plurality of air replenishment openings, the air replenishment openings and the flash chambers corresponding one to one and communicating with each other. The flash tank liquid inlet communicates with the first flash chamber of the flash chambers, and the flash tank liquid outlet communicates with the last flash chamber of the flash chambers.

Further, the flash tank further comprises a plurality of throttle hole plates, wherein the throttle hole plates are arranged inside an internal cavity of the flash tank to form a plurality of flash chambers, every two adjacent flash chambers communicating via throttle holes of the throttle hole plates.

Further, each of the throttle hole plates is a single-hole throttle hole plate comprising a throttle hole or a multi-hole throttle hole plate comprising a plurality of throttle holes.

Further, the flash tank further comprises a liquid delivery pipeline, a first end of the liquid delivery pipeline communicates with one of every two adjacent flash chambers, and a second end of the liquid delivery pipeline communicates with the other one of every two adjacent flash chambers.

Further, the flash tank further comprises a throttle device, the throttle device is arranged on the liquid delivery pipeline.

Further, the throttle device is an electronic expansion valve.

According to another aspect of the invention, an air conditioner is provided. The air conditioner comprises an evaporator, a condenser, and a flash tank arranged between the evaporator and the condenser, the flash tank is the foregoing flash tank.

Further, the air conditioner further comprises a multi-stage compressor, the multi-stage compressor has a plurality of compression chambers, and a plurality of air replenishment openings of the flash tank and the compression chambers correspond one to one.

By applying the technical solution of the invention, the flash tank comprises a flash tank liquid inlet and a flash tank liquid outlet. The flash tank further comprises: a plurality of flash chambers and a plurality of air replenishment openings, wherein the flash chambers are arranged in sequence, every two adjacent flash chambers communicating; the air replenishment openings and the flash chambers correspond one to one and communicate with each other; and the flash tank liquid inlet communicates with the first flash chamber of the flash chambers, and the flash tank liquid outlet communicates with the last flash chamber of the flash chambers. Due to provision of the flash chambers and the air replenishment openings, air may be replenished to the compression chambers of a multi-stage compressor to meet an air replenishment demand of the multi-stage compressor.

BRIEF DESCRIPTION OF THE DRAWINGS

The description drawings forming a part of the application are intended to provide further understanding of the invention. The schematic embodiments and illustrations of the invention are intended to explain the invention, and do not form improper limits to the invention. In the drawings.

Drawing marks: 10, liquid delivery pipeline; 11, flash tank liquid inlet; 12, flash tank liquid outlet; 13, flash chamber; 14, air replenishment opening; 15, throttle hole plate; and 16, throttle device.

DETAILED DESCRIPTION OF THE EMBODIMENTS

It is important to note that the embodiments in the application and the characteristics in the embodiments may be combined under the condition of no conflicts. The invention will be described below with reference to the drawings and in combination with the embodiments in detail.

Figure 1:
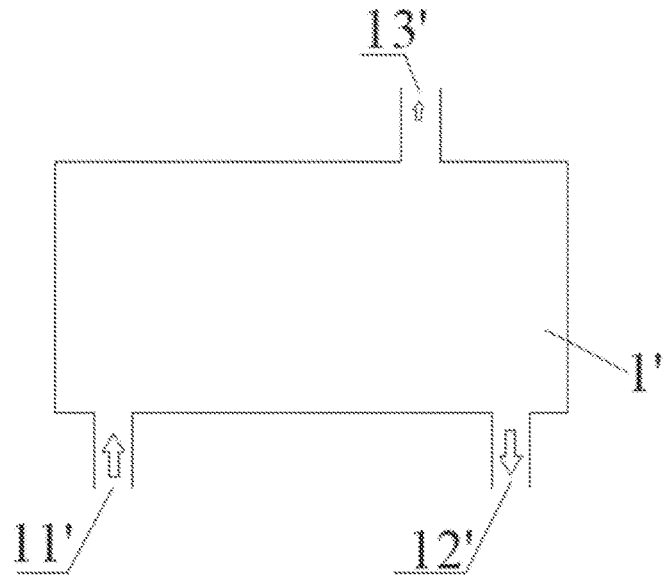
FIG. 1 shows a structural diagram of a flash tank in the prior art.
Figure 2:
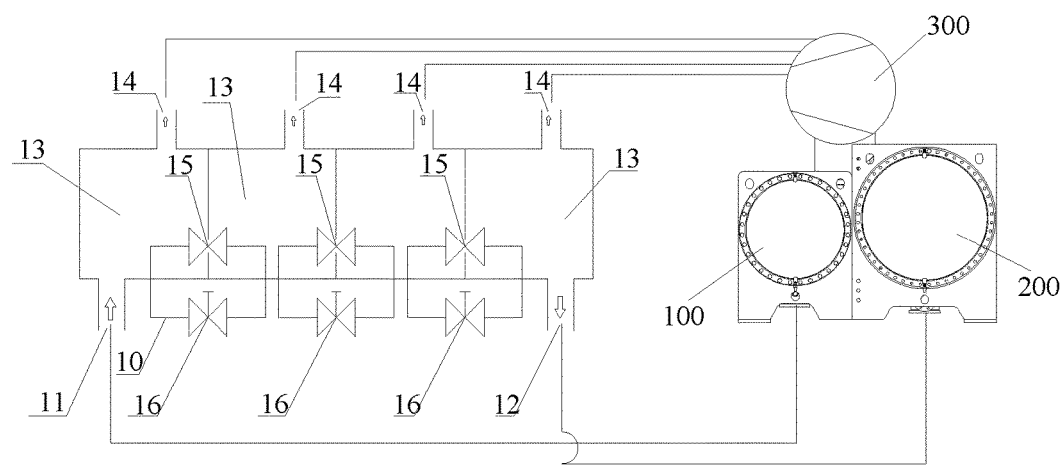
FIG. 2 shows a structural diagram of a flash tank according to an embodiment of the invention.

As shown in FIG. 2, the embodiments of the invention provide a flash tank. The flash tank comprises a flash tank liquid inlet 11 and a flash tank liquid outlet 12. The flash tank further comprises a plurality of flash chambers 13 and a plurality of air replenishment openings 14, wherein the flash chambers 13 are arranged in sequence, every two adjacent flash chambers 13 communicating; and the air replenishment openings 14 and the flash chambers 13 correspond one to one and communicate with each other. The flash tank liquid inlet 11 communicates with the first flash chamber in the flash chambers 13, and the flash tank liquid outlet 12 communicates with the last flash chamber in the flash chambers 13.

By means of the above-mentioned setting, due to provision of the flash chambers 13 and the air replenishment openings 14, when the flash tank is applied to a multi-stage compressor, air may be replenished to compression chambers of the multi-stage compressor to meet an air replenishment demand of the multi-stage compressor.

In the embodiments of the invention, specifically, the flash tank comprises four flash chambers 13 arranged in sequence and four air replenishment openings 14 in one-to-one correspondence to the above-mentioned four flash chambers 13.

Certainly, in non-given embodiments of the invention, more flash chambers 13 and more air replenishment openings 14 may also be provided according to actual requirements.

As shown in FIG. 2, in the embodiments of the invention, the flash tank further comprises a plurality of throttle hole plates 15, wherein the throttle hole plates 15 are arranged inside an internal cavity of the flash tank to form the flash chambers 13, every two adjacent flash chambers 13 communicating via throttle holes of the throttle hole plates 15. By means of the throttle hole plates 15, the flow of refrigerant liquid in a flowing process is reduced, and the flow of the refrigerant liquid entering the next-stage flash chamber 13 is limited.

As shown in FIG. 2, in the embodiments of the invention, each of the throttle hole plates 15 is a single-hole throttle hole plate comprising a throttle hole or a multi-hole throttle hole plate comprising a plurality of throttle holes.

As shown in FIG. 2, in the embodiments of the invention, the flash tank further comprises a liquid delivery pipeline 10, a first end of the liquid delivery pipeline 10 communicates with one of every two adjacent flash chambers 13, and a second end of the liquid delivery pipeline 10 communicates with the other one of every two adjacent flash chambers 13.

As shown in FIG. 2, in the embodiments of the invention, the flash tank further comprises a throttle device 16, the throttle device 16 is arranged on the liquid delivery pipeline 10.

The throttle device 16 mainly functions in throttling and pressure reduction. By means of the throttle device 16, the flow of the refrigerant liquid in the flowing process is reduced, and the flow of the liquid entering the next-stage flash chamber 13 is limited, thereby keeping the liquid under a stable pressure in a flowing process.

In the embodiments of the invention, preferably, the throttle device 16 is an electronic expansion valve. The electronic expansion valve is an adjustment element for adjusting a liquid supply of an evaporator 200 according to a preset program, and a better flow adjustment function can be provided in a low-temperature environment. Certainly, in the non-given embodiments of the invention, the throttle device 16 may also be set as a capillary tube or a ball valve according to actual requirements.

By means of the above-mentioned setting, on one hand, an air replenishment amount of each of the air replenishment opening 14 may be more accurately adjusted, and on the other hand, a throttling situation of an entire air conditioner may be adjusted, thereby effectively improving an energy efficiency of the air conditioner.

The invention also provides an air conditioner. The air conditioner comprises an evaporator 200, a condenser 100, and a flash tank arranged between the evaporator 200 and the condenser 100, the flash tank is the foregoing flash tank.

In the embodiments of the invention, the air conditioner further comprises a multi-stage compressor 300, the multi-stage compressor 300 has a plurality of compression chambers, and a plurality of air replenishment openings 14 of the flash tank and the compression chambers correspond one to one.

As shown in FIG. 2, in the embodiments of the invention, a specific working process of the above-mentioned flash tank is specifically described as follows.

High-temperature and high-pressure liquid refrigerants coming from the condenser 100 enter the first flash chamber 13 of the flash tank via the flash tank liquid inlet 11. In the first flash chamber 13, some of the liquid refrigerants become air under an action of flash evaporation, the air enters the multi-stage compressor 300 via the air replenishment opening 14 corresponding to the first flash chamber 13, and meanwhile, some coolants are taken away, such that the temperature of the remaining liquid refrigerants drops; and these temperature-dropping liquid refrigerants are throttled by the electronic expansion valve and the throttle hole plate 15 arranged in parallel between the first flash chamber 13 and the second flash chamber 13 adjacent to the first flash chamber, and then enter the second flash chamber 13. In the second flash chamber 13, some of the liquid refrigerants are subjected to flash evaporation and then enter the multi-stage compressor 300 via the air replenishment opening 14 corresponding to the second flash chamber 13, and meanwhile, some coolants are taken away, such that the temperature of the remaining liquid refrigerants drops; and these temperature-dropping liquid refrigerants are throttled by the throttle device and the throttle hole plate 15 located between the second flash chamber 13 and the third flash chamber 13, and then enter the third flash chamber 13. The liquid refrigerants finally enter the fourth flash chamber 13 (the last flash chamber of the flash tank) after the same change process. In the fourth flash chamber 13, some of the liquid refrigerants are subjected to flash evaporation and then enter the multi-stage compressor 300 via the air replenishment opening 14 corresponding to the fourth flash chamber 13, and meanwhile, some coolants are taken away, such that the temperature of the remaining liquid refrigerants drops, and these temperature-dropping liquid refrigerants enter the evaporator 200 via the flash tank liquid outlet 12.

In the embodiments of the invention, as shown in FIG. 2, as for each of the air replenishment openings 14, the air replenishment pressure in each of the flash chamber 13 is reduced in sequence from the flash tank liquid inlet 11 to the flash tank liquid outlet 12.

As shown in FIG. 2, in the invention and the embodiments of the invention, every two adjacent flash chambers 13 may be throttled by means of a throttle device 16 or throttled by means of a throttle hole plate 15. Certainly, in the non-given embodiments, only the throttle hole plate 15 may be arranged according to actual requirements or only a liquid delivery pipeline 10 of the throttle device 16 may be arranged.

From the above description, it may be seen that the above-mentioned embodiments of the invention achieve the following technical effects. The flash tank comprises a flash tank liquid inlet and a flash tank liquid outlet. The flash tank further comprises four flash chambers and four air replenishment openings, wherein the four flash chambers are arranged in sequence, every two adjacent flash chambers communicating; the four air replenishment openings and the four flash chambers correspond one to one and communicate with each other; and the flash tank liquid inlet communicates with the first flash chamber of the four flash chambers, and the flash tank liquid outlet communicates with the last flash chamber of the four flash chambers. Due to provision of the four flash chambers and the four air replenishment openings, air may be replenished to the compression chambers of a multi-stage compressor 300 to meet an air replenishment demand of the multi-stage compressor 300.

Further, the flash tank further comprises a throttle device arranged between every two adjacent flash chambers. By means of the above-mentioned setting, the air replenishment amount of each air replenishment opening may be more accurately adjusted.

The above is only the preferred embodiments of the invention, and not intended to limit the invention. There may be various modifications and variations in the invention for those skilled in the art. Any modifications, equivalent replacements, improvements and the like made within the spirit and principle of the invention shall fall within the scope of protection of the invention.

The invention claimed is:

1. A flash tank, comprising a flash tank liquid inlet (11) and a flash tank liquid outlet (12), and the flash tank is provided between an evaporator (200) and an condenser (100), the flash tank liquid inlet (11) is communicated with the condenser (100), the flash tank liquid outlet (12) is communicated with the evaporator (200), wherein the flash tank further comprises:
   a plurality of flash chambers (13), the flash chambers (13) are arranged in sequence, and every two adjacent flash chambers (13) communicating; and
   a plurality of air replenishment openings (14), the air replenishment openings (14) and the flash chambers (13) are corresponded one to one and are communicated with each other,
   wherein the flash tank liquid inlet (11) communicates with the first flash chamber of the flash chambers (13), and the flash tank liquid outlet (12) communicates with the last flash chamber of the flash chambers (13),
   the flash tank comprises a plurality of throttle hole plates (15), wherein the throttle hole plates (15) are arranged inside an internal cavity of the flash tank to form the flash chambers (13), every two adjacent flash chambers (13) communicating via throttle holes of the throttle hole plates (15),
   the flash tank comprises a liquid delivery pipeline (10) and a throttle device (16), wherein a first end of the liquid delivery pipeline (10) communicates with one of every two adjacent flash chambers (13), and a second end of the liquid delivery pipeline (10) communicates with the other one of every two adjacent flash chambers (13), the throttle device (16) is arranged on the liquid delivery pipeline (10).

2. The flash tank according to claim 1, wherein each of the throttle hole plates (15) is a single-hole throttle hole plate comprising a throttle hole or a multi-hole throttle hole plate comprising a plurality of throttle holes.

3. The flash tank according to claim 1, wherein the throttle device (16) is an electronic expansion valve.

4. An air conditioner, comprising an evaporator (200), a condenser (100), and a flash tank arranged between the evaporator (200) and the condenser (100), wherein the flash tank is the flash tank according to claim 1.

5. The air conditioner according to claim 4, further comprising a multi-stage compressor (300), wherein the multi-stage compressor (300) has a plurality of compression chambers, and a plurality of air replenishment openings (14) of the flash tank and the compression chambers correspond one to one respectively.

6. An air conditioner, comprising an evaporator (200), a condenser (100), and a flash tank arranged between the evaporator (200) and the condenser (100), wherein the flash tank is the flash tank according to claim 2.

7. An air conditioner, comprising an evaporator (200), a condenser (100), and a flash tank arranged between the evaporator (200) and the condenser (100), wherein the flash tank is the flash tank according to claim 3.

* * * * *